(12) United States Patent
Tsuchiya (10) Patent No.: US 8,576,268 B2
(45) Date of Patent: Nov. 5, 2013

(54) OPTICAL DEVICE, OPTICAL MEMBER AND IMAGE FORMING APPARATUS WITH THE SAME

(75) Inventor: Hiroaki Tsuchiya, Osaka (JP)

(73) Assignee: Kyocera Mita Corporation (JP)

( * ) Notice: Subject to any disclaimer, the term of this patent is extended or adjusted under 35 U.S.C. 154(b) by 0 days.

(21) Appl. No.: 13/399,462

(22) Filed: Feb. 17, 2012

(65) Prior Publication Data
US 2012/0218370 A1 Aug. 30, 2012

(30) Foreign Application Priority Data

Feb. 24, 2011 (JP) ................................. 2011-038322

(51) Int. Cl.
*B41J 15/14* (2006.01)
*B41J 27/00* (2006.01)

(52) U.S. Cl.
USPC .......................................... 347/242; 347/257

(58) Field of Classification Search
USPC ................. 347/230, 241–244, 256–258, 263; 359/198.1, 205.1–207.6, 808, 811, 819
See application file for complete search history.

(56) References Cited

U.S. PATENT DOCUMENTS

| 5,581,391 | A | * | 12/1996 | Uzuki et al. | 359/205.1 |
| 7,535,594 | B2 | * | 5/2009 | Yoshizawa et al. | 358/1.4 |
| 7,760,228 | B2 | * | 7/2010 | Mamiya | 347/257 |
| 8,345,355 | B2 | * | 1/2013 | Jibu et al. | 359/718 |

FOREIGN PATENT DOCUMENTS

| JP | 07199100 A | * | 8/1995 |
| JP | 9-329755 | | 12/1997 |
| JP | 2006-145717 | | 6/2006 |

* cited by examiner

*Primary Examiner* — Hai C Pham
(74) *Attorney, Agent, or Firm* — Gerald E. Hespos; Michael J. Porco; Matthew T. Hespos (57) ABSTRACT

An optical device includes a laser light source for outputting a laser beam; an optical member including an aspherical lens with an incident surface on which the laser beam is incident and an output surface from which the laser beam is output, and adapted to scan the laser beam output from the output surface across a predetermined target; and a housing for housing the optical member. The optical member further includes a first positioning portion at a side of the incident surface and a second positioning portion at a side of the output surface. The housing includes a first engaging portion to be engaged with the first positioning portion and a second engaging portion to be engaged with the second positioning portion. The first and second positioning portions have mutually different shapes.

14 Claims, 10 Drawing Sheets

|  | W1~W4, L1~L4 |
|---|---|
| FIRST UPPER PROJECTION | W1:SHORT / L1:LONG |
| FIRST LOWER PROJECTION | W2:SHORT / L2:SHORT |
| SECOND UPPER PROJECTION | W3:LONG / L3:SHORT |
| SECOND LOWER PROJECTION | W4:LONG / L4:LONG |

FIG.10

|  | W1~W4, L1~L4 |
|---|---|
| FIRST UPPER PROJECTION | W1:LONG / L1:SHORT |
| FIRST LOWER PROJECTION | W2:SHORT / L2:SHORT |
| SECOND UPPER PROJECTION | W3:SHORT / L3:LONG |
| SECOND LOWER PROJECTION | W4:LONG / L4:LONG |

OPTICAL DEVICE, OPTICAL MEMBER AND IMAGE FORMING APPARATUS WITH THE SAME

This application is based on Japanese Patent Application Serial No. 2011-038322 filed with the Japan Patent Office on Feb. 24, 2011, the contents of which are hereby incorporated by reference.

BACKGROUND

The present disclosure relates to an optical device for scanning a laser beam across a predetermined target, e.g. a photoconductive drum and an image forming apparatus with the same.

An optical device for scanning a laser beam across a predetermined target is used as an exposure device (laser scanner unit (LSU)) in an image forming apparatus such as a copier, a printer or a facsimile machine. The exposure device scans a laser beam across a photoconductive drum based on image information to form an electrostatic latent image on the photoconductive drum.

The exposure device includes, as basic constituent elements, a laser light source for outputting a laser beam, a collimator lens, a cylindrical lens, a polygon mirror, an fθ lens, a reflecting mirror and the like. Out of these, the fθ lens has an important function of scanning the laser beam reflected by the polygon mirror across the photoconductive drum. Accordingly, the fθ lens needs to be accurately mounted.

Since image forming apparatuses have been required to have high image quality and high image density in recent years, the fθ lens of the exposure device is mostly designed to have an aspherical surface. Although the aspherical fθ lens has an aspherical shape in a main scanning direction of the laser beam, it is difficult to recognize asymmetry on the external appearance when a degree of asymmetry is small. Thus, it is difficult for an operator to visually judge a correct orientation of the fθ lens. Therefore, there is a need for a means for preventing the inverted mounting of the fθ lens.

As a conventional technology for preventing the above inverted mounting, it is known to process the fθ lens. This fθ lens includes, on an output surface side, a pair of upper and lower first projecting portions and a second projecting portion at a predetermined distance in a longitudinal direction from the first projecting portion. On the other hand, a housing in which the fθ lens is mounted includes positioning pins for positioning the fθ lens by being engaged with the first projecting portions, and an interference pin. The interference pin interferes with the second projecting portion when the fθ lens is mounted in an inverted manner. This enables the operator to identify a correct orientation of the fθ lens by knowing whether or not there is any interference by the interference pin in mounting the fθ lens into the housing. In this way, the inverted mounting of the fθ lens is prevented.

However, more and more fθ lenses have been formed to have an aspherical surface in recent years, and it has been more difficult for an operator to visually judge a correct orientation of the fθ lens in mounting the fθ lens. Thus, it is hard to say that the inverted mounting of the fθ lens can be reliably prevented by the inverted mounting preventing means of the conventional technology, wherefore there is a need for a more accurate inverted mounting preventing means.

An object of the present disclosure is to provide an optical device capable of reliably preventing the inverted mounting of an optical element such as an fθ lens, an optical member and an image forming apparatus with the same.

SUMMARY

In order to achieve the above object, the present disclosure is directed to an optical device, including a laser light source for outputting a laser beam; an optical member including an aspherical lens with an incident surface on which the laser beam is incident and an output surface from which the laser beam is output, and adapted to scan the laser beam output from the output surface across a predetermined target; and a housing for housing the optical member. The optical member further includes a first positioning portion at a side of the incident surface and a second positioning portion at a side of the output surface. The housing includes a first engaging portion to be engaged with the first positioning portion and a second engaging portion to be engaged with the second positioning portion. The first and second positioning portions have mutually different shapes.

Another aspect of the present disclosure is directed to an image forming apparatus, including a photoconductive drum and an optical device for irradiating the circumferential surface of the photoconductive drum with a laser beam, wherein the optical device has the above construction.

Still another aspect of the present invention is directed to an optical member to be housed in a housing including a first engaging portion and a second engaging portion, including an optical member body; a first positioning portion; and a second positioning portion. The optical member body includes an aspherical lens with an incident surface on which a laser beam is incident and an output surface from which the laser beam is output, and scans the laser beam output from the output surface across a predetermined target. The first positioning portion is arranged at a side of the incident surface of the optical member body and to be engaged with the first engaging portion of the housing. The second positioning portion is arranged at a side of the output surface of the optical member body, shaped differently from the first positioning portion and to be engaged with the second engaging portion of the housing.

DETAILED DESCRIPTION

Figure 1:
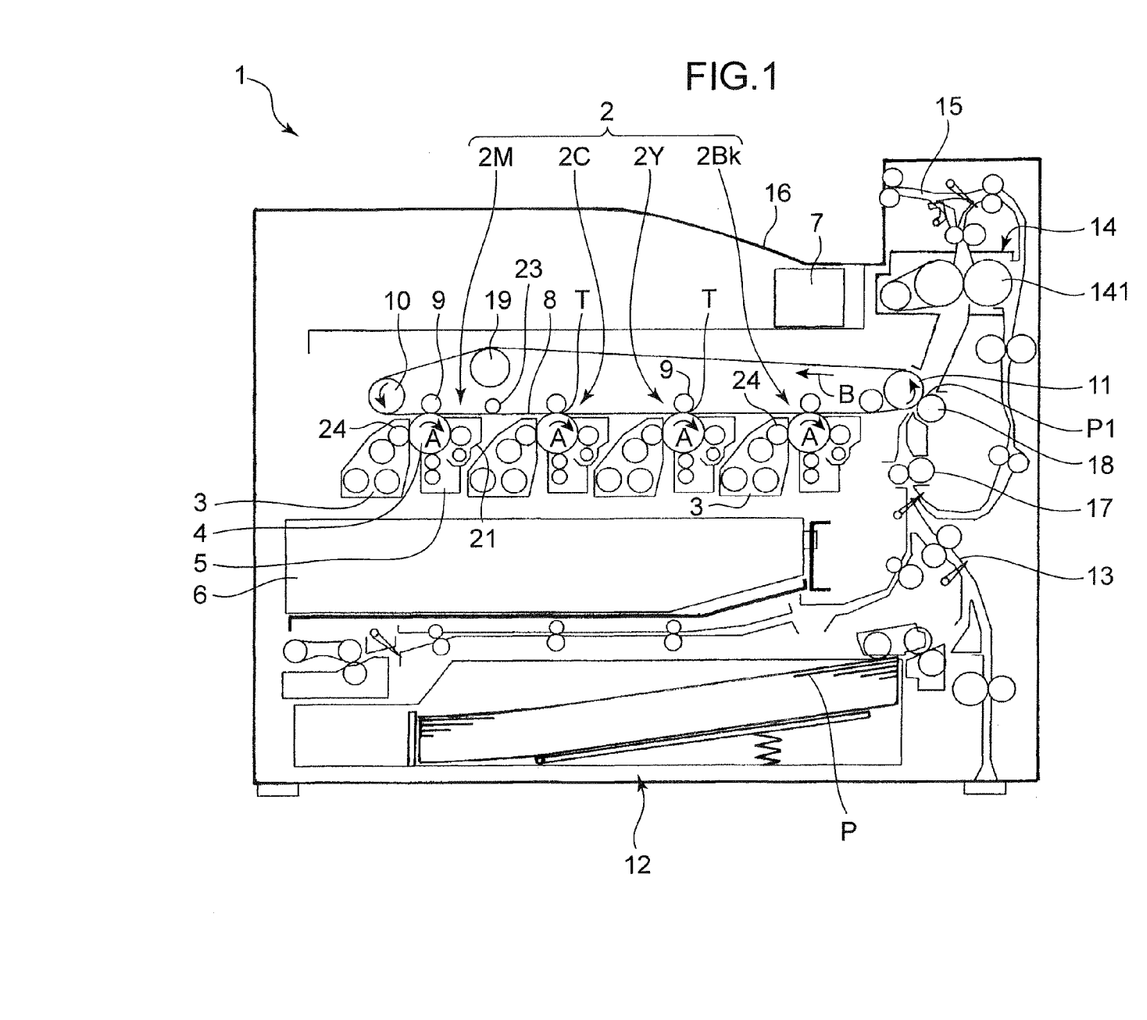
FIG. 1 is a diagram schematically showing the internal construction of an image forming apparatus according to an embodiment of the present disclosure.

Hereinafter, an embodiment of the present disclosure is described in detail with reference to the drawings. FIG. 1 is a diagram schematically showing the internal construction of an image forming apparatus 1 according to the embodiment of the present disclosure. The image forming apparatus 1 is a printer, e.g. a tandem color printer including image forming units 2 (2M, 2C, 2Y, 2Bk) of respective colors of magenta (M), cyan (C), yellow (Y) and black (Bk) as shown in FIG. 1. Each of the image forming units 2M, 2C, 2Y and 2Bk includes a developing device 3, a charger 5, an exposure device 6 (optical device), a toner supply unit 7, a cleaner 21 and a primary transfer roller 9.

The toner supply unit 7 stores toners of the respective colors of magenta, cyan, yellow and black. The developing device 3 includes a developing roller 24 for supplying the toner supplied from the toner supply unit 7 to the photoconductive drum 4. The developing roller 24 is, for example, a cylindrical developing sleeve, the surface of which is made of a nonmagnetic material such as aluminum. A magnetic material or the like is arranged in this developing sleeve. A developer composed of toner and carrier (in the case of a two-component developer) in the developing device 3 is attracted to the surface of the developing roller 24 by a magnetic force of the magnetic material and the developing roller 24 is rotated in a predetermined direction, whereby only the toner of the developer moves to the surface of the photoconductive drum 4. In this way, a toner image is formed on the photoconductive drum 4.

The photoconductive drums 4 are located below a transfer belt 8 to be described later and arranged in contact with the outer surface of the transfer belt 8. The photoconductive drum 4 for magenta, that for cyan, that for yellow and that for black are arranged side by side from an upstream side in a rotating direction B of the transfer belt 8. Further, the photoconductive drums 4 are rotated in a clockwise direction (shown direction A) in FIG. 1.

The primary transfer roller 9 is arranged at a position facing the photoconductive drum 4 via the transfer belt 8 while being held in contact with the inner surface of the transfer belt 8. The primary transfer roller 9 is a roller which is driven and rotated by the rotation of the transfer belt 8 and nips the transfer belt 8 together with the photoconductive drum 4, thereby forming a primary transfer portion T for primarily transferring a toner image of the corresponding color formed on the photoconductive drum 4 to the transfer belt 8. In the primary transfer portions T, toner images of the respective colors are transferred to the transfer belt 8 in a superimposition manner, whereby a color toner image is formed on the transfer belt 8.

The chargers 5 uniformly charge the circumferential surfaces of the photoconductive drums 4. The exposure device 6 scans laser beams based on document image data input from an external PC (Personal Computer) or the like across the circumferential surfaces of the photoconductive drums 4 in a main scanning direction to form electrostatic latent images on the respective circumferential surfaces. The main scanning direction is a direction in which a laser beam is scanned in a longitudinal direction of the photoconductive drum 4.

The cleaner 21 is arranged on the circumferential surface of each photoconductive drum 4 to remove remaining toner and the like on the circumferential surface.

The transfer belt 8 is mounted between a driven roller 10 and a drive roller 11. Further, the transfer belt 8 is biased upward by a tension roller 19. The drive roller 11 rotates upon receiving a drive force from an unillustrated drive source and drives and rotates the transfer belt 8. The driven roller 10 is driven and rotated by the rotation of the transfer belt 8. In this way, the transfer belt 8 rotates in a direction B (counterclockwise direction).

Further, a secondary transfer position P1 is formed between the transfer belt 8 and a secondary transfer roller 18 arranged to face the drive roller 11. When a sheet P passes through the secondary transfer position P1, a toner image on the transfer belt 8 is secondarily transferred to the sheet P.

A pair of registration rollers 17 are arranged below the secondary transfer position P1. The registration rollers 17 convey the sheet P toward the secondary transfer position P1 at an appropriate timing and correct the oblique feed of the sheet P.

A fixing device 14 for performing a fixing process on the sheet P having the toner image secondarily transferred thereto is provided above the secondary transfer position P1. The fixing device 14 includes a pair of fixing rollers 141 and fixes the secondarily transferred toner image to the sheet P by nipping the sheet P between the fixing rollers 141 while heating the sheet P.

A sheet cassette 12 for storing a stack of sheets is arranged at a position below the exposure device 6. A sheet conveyance path 13 for guiding a sheet P from the sheet cassette 12 to the secondary transfer position P1 is provided between the sheet cassette 12 and the secondary transfer position P1. The above registration rollers 17 are arranged in the sheet conveyance path 13. A plurality of pairs of rollers for guiding a sheet P are arranged at appropriate positions in the sheet conveyance path 13 in addition to the registration rollers 17.

A discharge unit 16 to which a sheet P having the fixing process performed thereon by the fixing device 14 is discharged is formed on the upper surface of the printer 1. A sheet discharge path 15 for guiding the sheet P is formed between the discharge unit 16 and the fixing device 14. Pairs of rollers for conveying the sheet P are also arranged at appropriate positions in the sheet discharge path 15.

Figure 2:
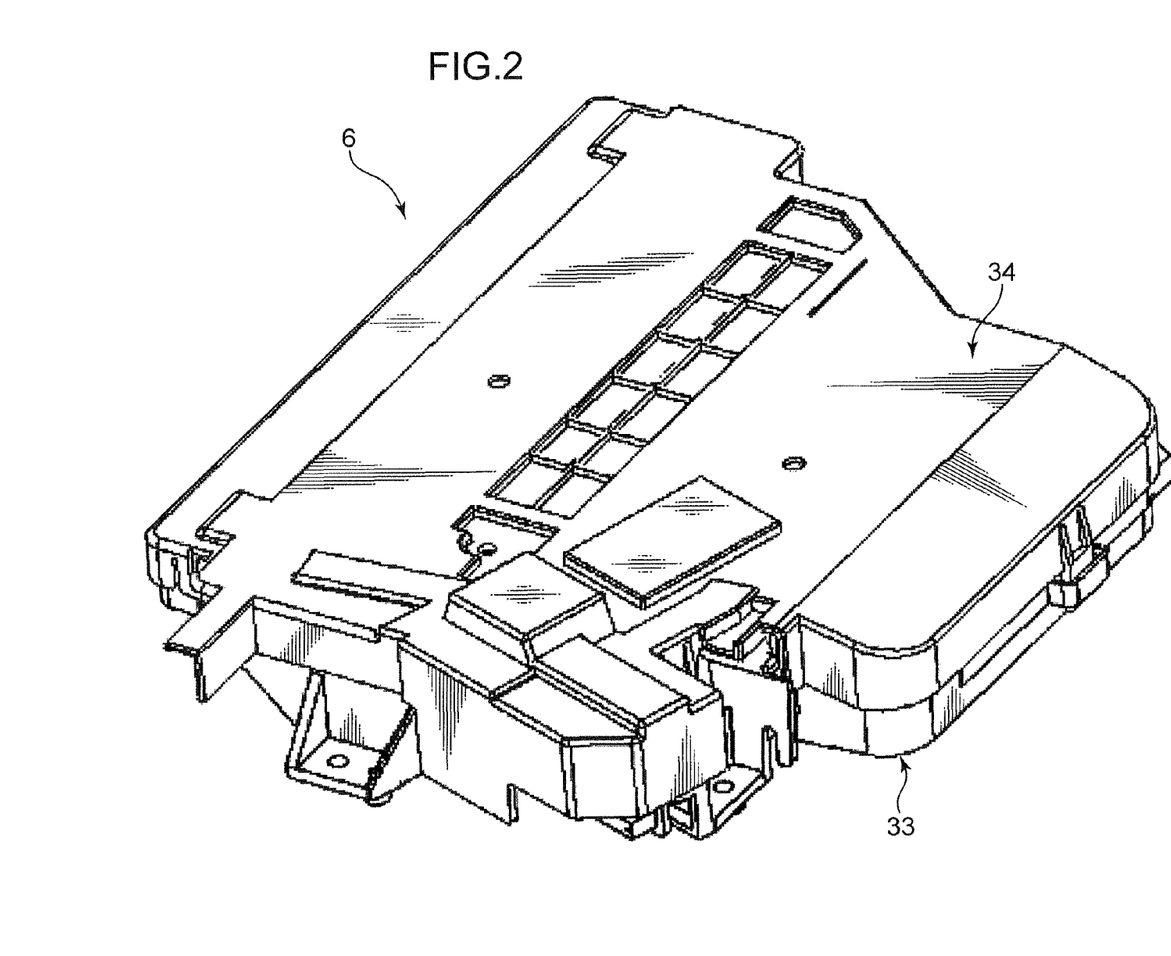
FIG. 2 is an external perspective view of an exposure device when viewed obliquely from above.
Figure 3:
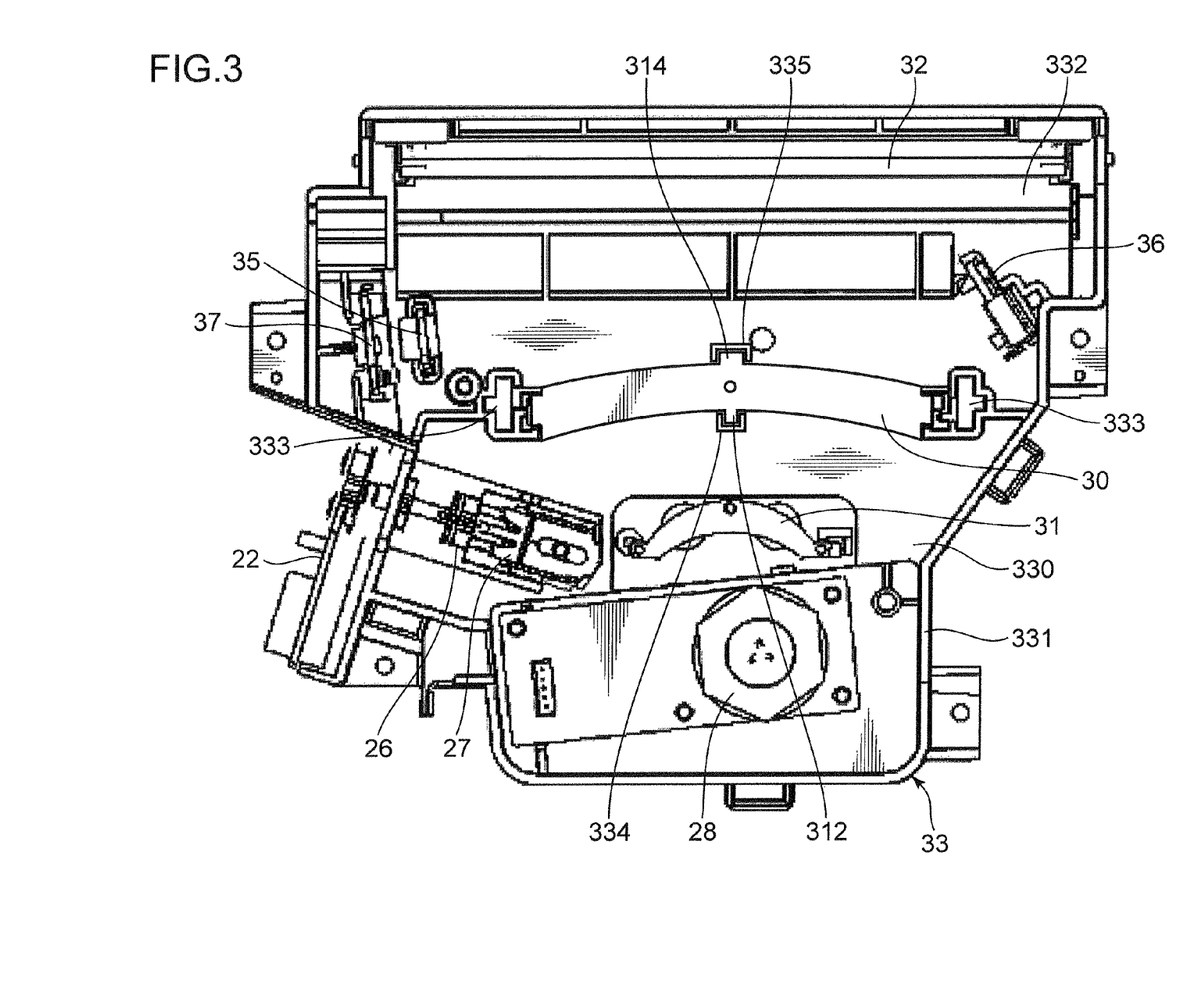
FIG. 3 is a plan view showing the internal construction of the exposure device with a cover removed.
Figure 4:
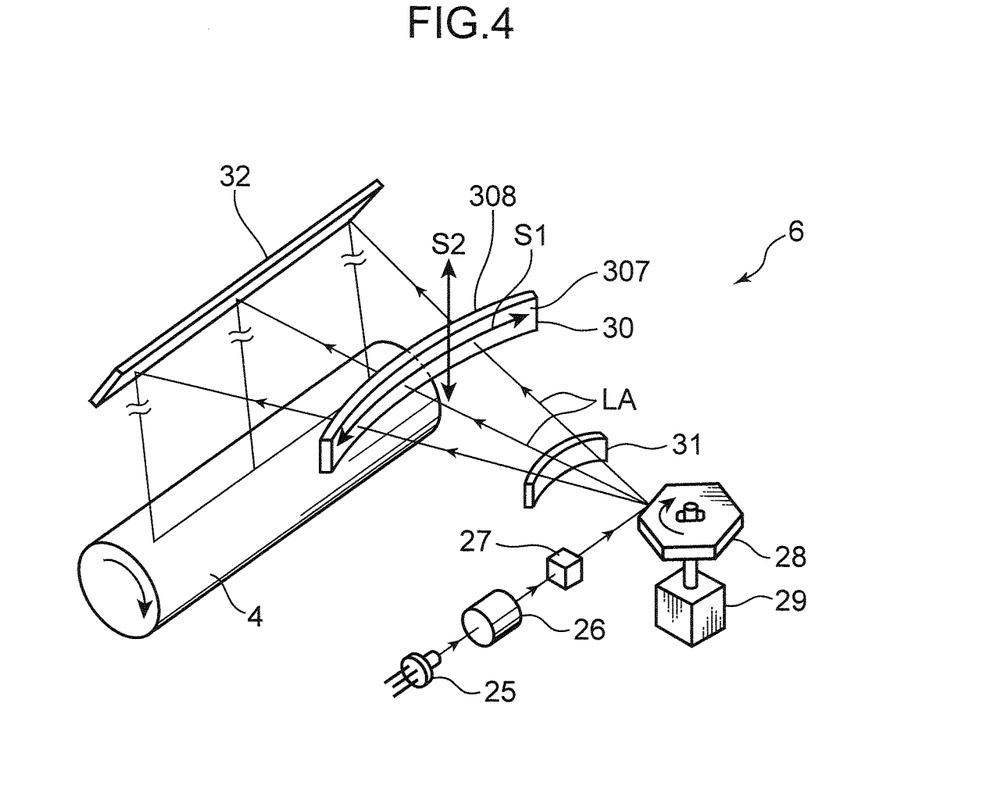
FIG. 4 is a view diagrammatically showing main constituent elements of the exposure device to explain a path of a laser beam.

Next, the exposure device 6 is described with reference to FIGS. 2 to 4. FIG. 2 is an external perspective view of the exposure device 6 when viewed obliquely from above. FIG. 3 is a plan view showing the internal construction of the exposure device with a cover removed. FIG. 4 is a view diagrammatically showing main constituent elements of the exposure device 6 to explain a path of a laser beam.

As shown in FIG. 2, the exposure device 6 includes a housing 33 for housing various optical elements, and a cover 34 mounted on the upper surface of the housing 33 and separating the optical elements from the outside. The housing 33 includes a bottom wall 330 and a side wall 331 standing at the peripheral edge of the bottom wall 330 as shown in FIG. 3. A control board and a reflecting mirror 32 are respectively mounted at predetermined positions on the side wall 331, and a collimator lens 26, a cylindrical lens 27, a polygon mirror 28, a first lens 31, a second lens 30, a BD (Beam Detect) mirror 36, an SOS (Start of Scan) lens 35 and a BD board 37 are mounted on the bottom wall 330.

A laser light source 25 such as an LED for generating a laser beam is mounted on the control board 22. As shown in FIG. 4, the laser light source 25 outputs a laser beam (arrow) along a predetermined optical axis. The collimator lens 26 is a lens which is arranged near the laser light source 25, on which a laser beam output from the laser light source 25 is incident and which converts the divergent laser beam into a parallel beam to adjust a beam diameter. The cylindrical lens 27 is a lens which is arranged downstream of the collimator lens 26 in a propagation direction of the laser beam and converts the laser beam output from the collimator lens 26 into a linear beam long in the main scanning direction. The positions of the collimator lens 26 and the cylindrical lens 27 are set on the optical axis of the laser beam.

The polygonal mirror 28 is arranged downstream of the cylindrical lens 27 in the propagation direction of the laser beam. The polygonal mirror 28 is rotated at a predetermined speed by a polygon motor 29 and polarizes the laser beam output from the cylindrical lens 27 so that the laser beam is scanned in the longitudinal direction of the photoconductive drum 4 (i.e. main scanning direction). Since the polygonal mirror 28 is rotated clockwise in FIG. 4, the laser beam is scanned from the left side toward the right side of the photoconductive drum 4.

The first lens 31 is arranged downstream of the polygonal mirror 28 in the propagation direction of the laser beam and the second lens 30 is arranged downstream of the first lens 31 in the propagation direction of the laser beam. The first and second lenses 31, 30 are fθ lens. The first and second lenses 31, scan the laser beam equiangularly scanned by the polygonal mirror 28 across the photoconductive drum 4 at a constant speed in the main scanning direction. Further, the first and second lenses 31, 30 can accurately irradiate the laser beam to the photoconductive drum 4 even if the polygonal mirror 28 has an optical face tangle error.

The reflecting mirror 32 is arranged downstream of the second lens 30 in the propagation direction of the laser beam, reflects the laser beam scanned by the second lens 30 and introduces the laser beam to the photoconductive drum 4 via a window portion 332 (see FIG. 3). The window portion 332 is formed at a position corresponding to the reflecting mirror 32 on the bottom wall of the housing. The laser beam introduced to the photoconductive drum 4 forms an electrostatic latent image on the photoconductive drum 4.

Note that a part of the laser beam is reflected by the BD mirror 36 when the laser beam is scanned by the second lens 30. The reflected laser beam is focused by the SOS lens 35 and detected by a BD (Beam Detect) sensor mounted on the BD board 37. The presence of the laser beam is judged and a start timing of the laser beam is detected based on a BD signal output from the BD board 37.

Figure 5:
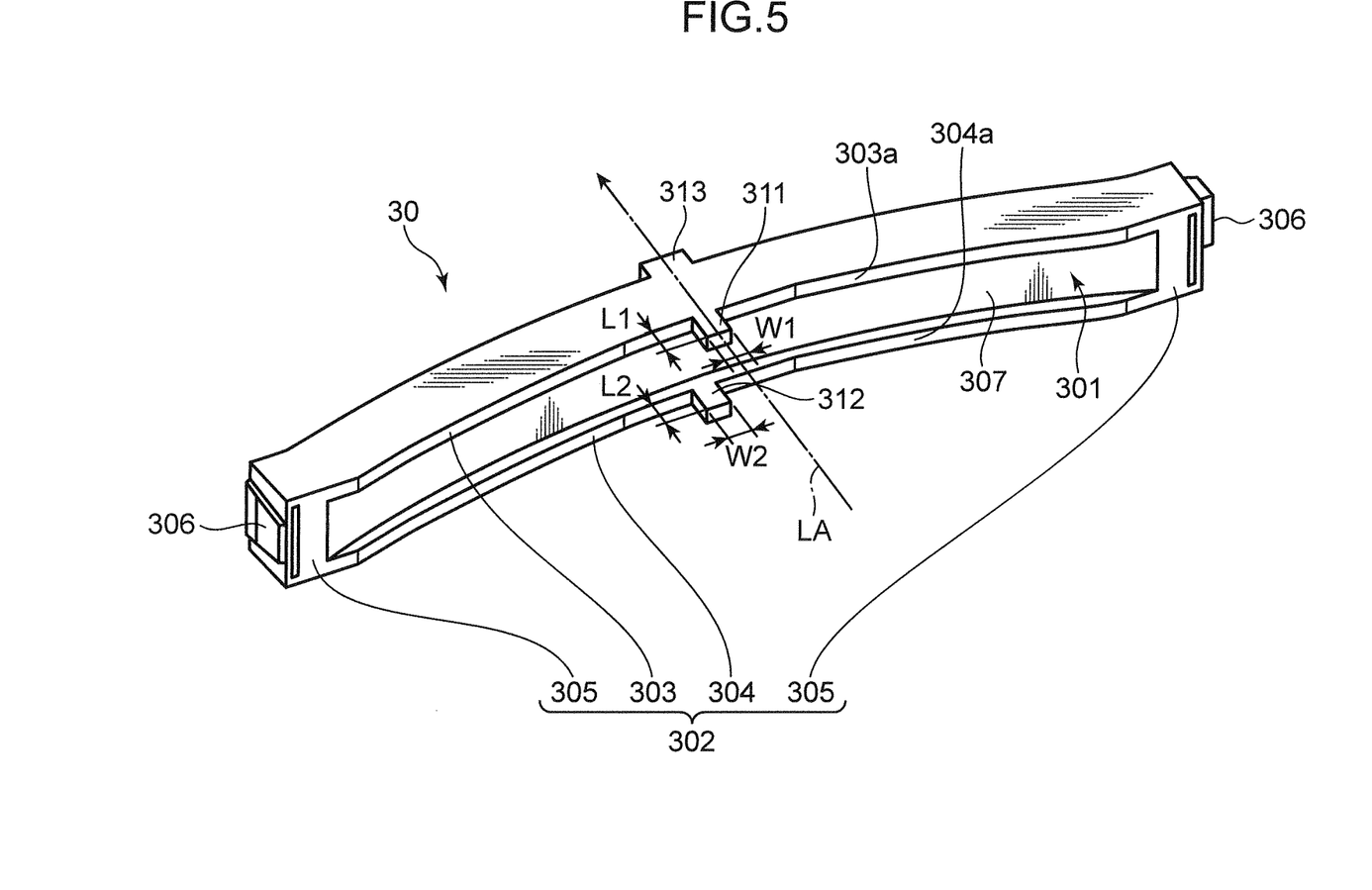
FIG. 5 is a perspective view showing one embodiment of a second lens when viewed from an incident surface side.
Figure 6:
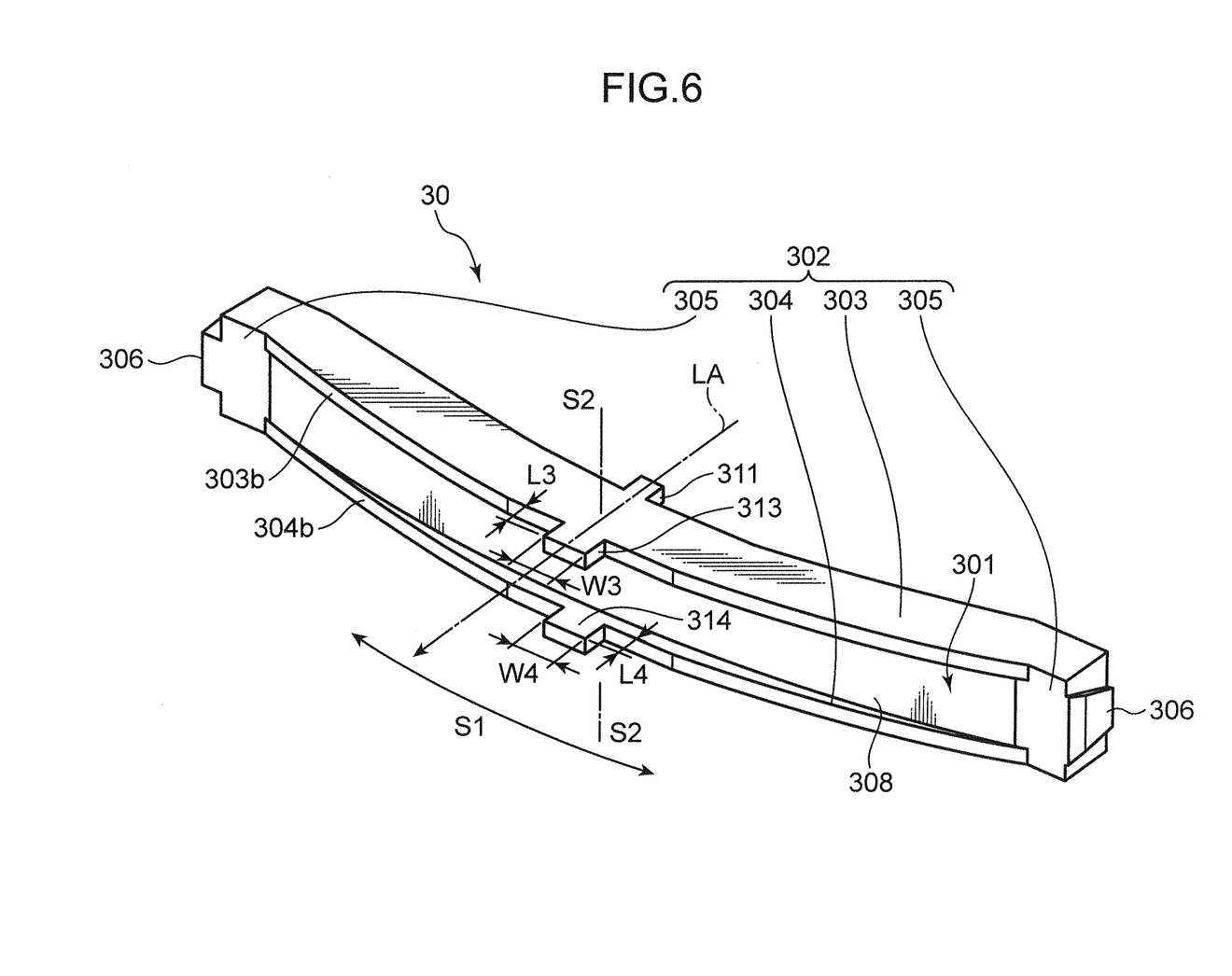
FIG. 6 is a perspective view of the second lens when viewed from an output surface side.

Next, the structure of the second lens 30 is described in detail with reference to FIGS. 5 and 6. FIG. 5 is a perspective view showing the second lens 30 when viewed from a side of an incident surface 307, and FIG. 6 is a perspective view of the second lens 30 when viewed from a side of an output surface 308. The second lens 30 is an example of an optical member of the present disclosure and includes a lens body 301 (optical member body) and a holding portion 302.

The lens body 301 is made of a resin material and extends along the main scanning direction S1 (see FIG. 4) of the laser beam and the main scanning direction S1 is a longitudinal direction thereof. The lens body 301 includes the incident surface 307 on which the laser beam having passed through the first lens 31 is incident and the output surface 308 which is located at a side opposite to the incident surface 307 and from which the laser beam incident on the incident surface 307 is output. In this embodiment, a direction perpendicular to the main scanning direction S1 and extending in parallel with the incident surface 307 and the output surface 308 of the lens body 301 is referred to as a sub scanning direction S2 for the sake of convenience. Further, a direction in which the laser beam passes through the lens body 301, i.e. a direction of the laser beam entering the lens body 301 through the incident surface 307, output from the output surface 308 and propagating toward the reflecting mirror 32 is referred to as an optical axis direction LA.

The lens body 301 is an aspherical lens. Thus, the lens body 301 has an aspherical shape in the main scanning direction S1. Specifically, the shape of the lens body 301 differs at the left and right sides of a middle part thereof in the main scanning direction S1. Further, the lens body 301 is such that the shape of the incident surface 307 and that of the output surface 308 are not in a mirror image relationship.

The holding portion 302 is composed of an upper wall 303, a lower wall 304 and a pair of side walls 305. The upper wall 303 is shaped in conformity with the upper surface of the lens body 301, the lower wall 304 is shaped in conformity with the bottom surface of the lens body 301, and the pair of side walls 305 are shaped in conformity with the corresponding side surfaces of the lens body 301. The lens body 301 is held between the upper wall 303, the lower wall 304 and the pair of side walls 305. The holding portion 302 and the lens body 301 are integrally molded. Note that the both may be separate members and the second lens 30 may be formed by engaging these members. However, it is preferable to adopt integral molding to improve accuracy in the positional relationship of the both.

The upper wall 303 includes a first upper end surface 303a at the side of the incident surface 307 and a second upper end surface 303b at the side of the output surface 308. The first and second upper end surfaces 303a, 303b are end surfaces facing in opposite directions along the optical axis direction LA.

The lower wall 304 includes a first lower end surface 304a at the side of the incident surface 307 and a second lower end surface 304b at the side of the output surface 308. The first and second lower end surfaces 304a, 304b are end surfaces facing in opposite directions along the optical axis direction LA.

Each of the pair of side walls 305 includes a locking projection 306 on its end surface. A pair of locking projections 306 project in opposite directions from the end surfaces along the longitudinal direction of the lens body 301. The housing 33 is formed with locking portions 333 to be engaged with the pair of locking projections 306.

The holding portion 302 further includes a first upper projection 311 integrally formed to the first upper end surface 303a of the upper wall 303 and a first lower projection 312 integrally formed to the first lower end surface 304a of the lower wall 304 at the side of the incident surface 307 (first positioning portion/first projection). The first upper projection 311 has a convex shape projecting from the first upper end surface 303a and the first lower projection 312 also has a convex shape projecting form the first lower end surface 304a. The first upper and lower projections 311, 312 are facing each other in the sub scanning direction S2 with the lens body 301 located therebetween. The first upper and lower projections 311, 312 are so shaped as not to hinder the laser beam entering through the incident surface 307.

The holding portion 302 furthermore includes a second upper projection 313 integrally formed to the second upper end surface 303b of the upper wall 303 and a second lower projection 314 integrally formed to the second lower end surface 304b of the lower wall 304 at the side of the output surface 308 (second positioning portion/second projection). The second upper projection 313 has a convex shape projecting from the second upper end surface 303b and the second lower projection 314 also has a convex shape projecting form the second lower end surface 304b. The second upper and lower projections 313, 314 are facing each other in the sub scanning direction S2 with the lens body 301 located therebetween. The second upper and lower projections 313, 314 are so shaped as not to hinder the laser beam output from the output surface 308.

The first upper projection 311, the first lower projection 312, the second upper projection 313 and the second lower projection 314 are formed at a substantially middle position in the longitudinal direction of the lens body 301. The formation positions of the first upper projection 311, the first lower projection 312, the second upper projection 313 and the second lower projection 314 are preferably set at the substantially middle position in the longitudinal direction of the lens body 301 in the case of integrally molding the lens body 301 and the holding portion 302.

The first upper projection 311, the first lower projection 312, the second upper projection 313 and the second lower projection 314 are formed to have mutually different shapes. Specifically, the first upper projection 311 has a predetermined first width W1 (width at the incident surface side) along the main scanning direction S1 and a predetermined first length L1 (length at the incident surface side) along the optical axis direction LA. Similarly, the first lower projection 312 has a second width W2 (width at the incident surface side) along the main scanning direction S1 and a second length L2 (length at the incident surface side) along the optical axis direction LA. The second upper projection 313 has a third width W3 (width at the output surface side) along the main scanning direction S1 and a third length L3 (length at the output surface side) along the optical axis direction LA. The second lower projection 314 has a fourth width W4 (width at the output surface side) along the main scanning direction S1 and a fourth length L4 (length at the output surface side) along the optical axis direction LA. The first to fourth widths W1 to W4 and the first to fourth lengths L1 to L4 are so specified that the first upper projection 311, the first lower projection 312, the second upper projection 313 and the second lower projection 314 have mutually different shapes.

In the embodiment shown in FIGS. 5 and 6, the first to fourth widths W1 to W4 and the first to fourth lengths L1 to L4 are set as follows. That is, the first and second widths W1, W2 are set to be equal (W1=W2), and the first length L1 is set to be longer than the second and third lengths L2, L3 (L1>L2, L1>L3). Further, the second length L2 is set to be shorter than the fourth length L4 (L2<L4), and the third and fourth widths W3, W4 are set to be equal to each other and longer than the first and second widths W1, W2 (W3=W4>W1=W2). Further, the third length L3 is set to be shorter than the fourth length L4 (L3<L4). By setting the first to fourth widths W1 to W4 and the first to fourth lengths L1 to L4 in this way, the first upper projection 311, the first lower projection 312, the second upper projection 313 and the second lower projection 314 can have mutually different shapes.

Figure 7:
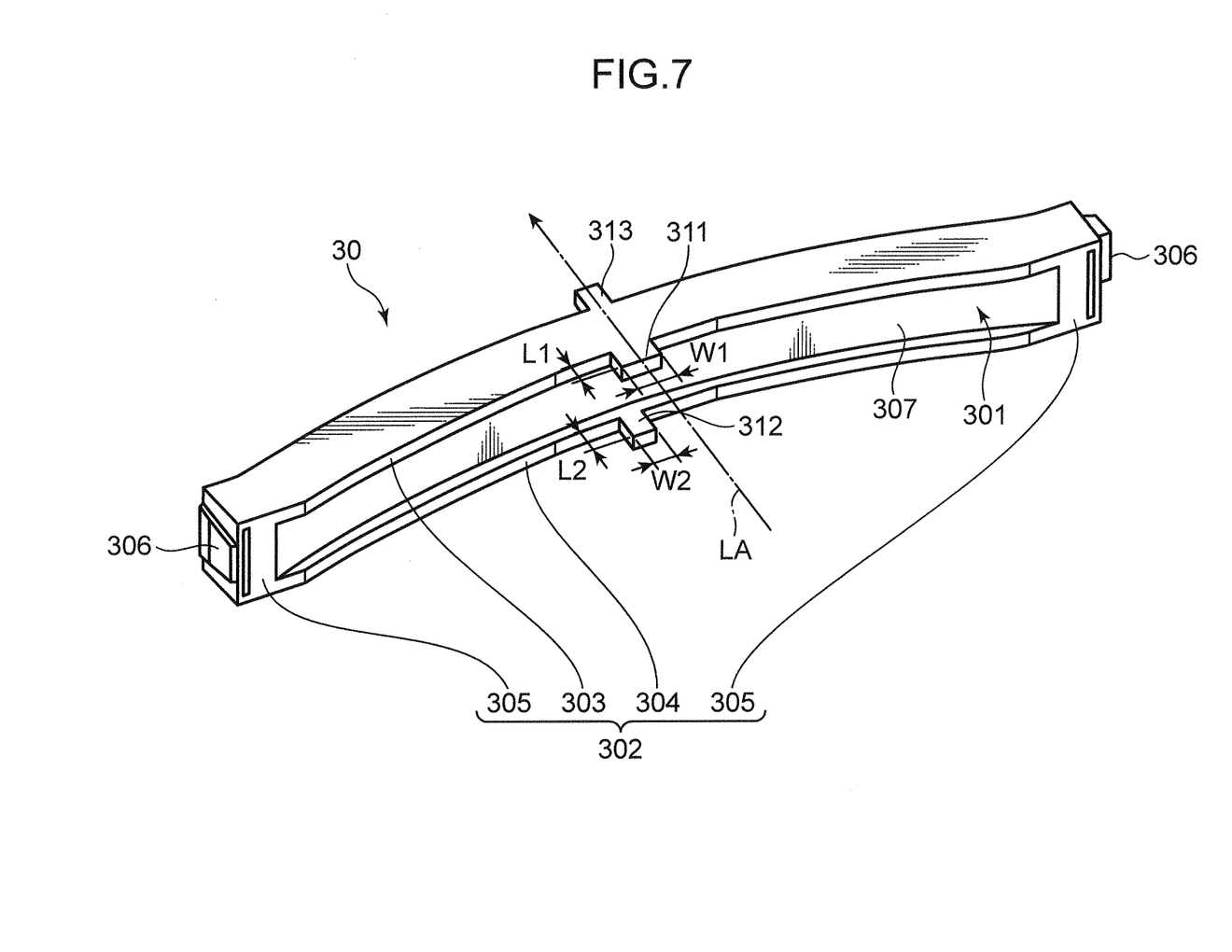
FIG. 7 is a perspective view of a second lens according to another embodiment when viewed from the incident surface side.
Figure 8:
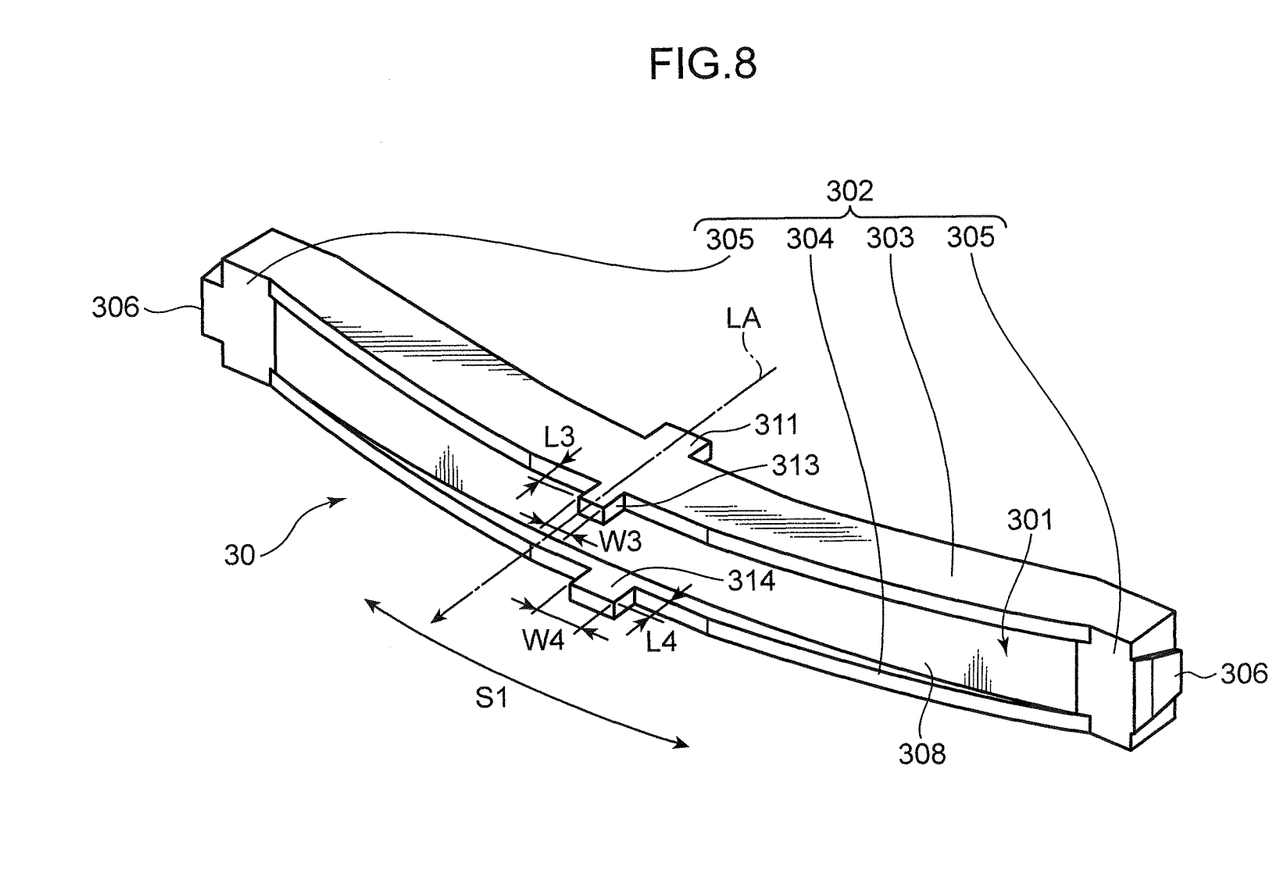
FIG. 8 is a perspective view of the second lens according to the other embodiment when viewed form the output surface side.

The setting of the first to fourth widths W1 to W4 and the first to fourth lengths L1 to L4 is not limited to the setting of the embodiment shown in FIGS. 5 and 6. For example, the first to fourth widths W1 to W4 and the first to fourth lengths L1 to L4 may be set as shown in FIGS. 7 and 8. That is, the first and second lengths L1, L2 are set to be equal (L1=L2), and the first width W1 is set to be longer than the second and third widths W2, W3 (W1>W2, W1>W3). Further, the second width W2 is set to be shorter than the fourth width W4 (W2<W4), and the third and fourth lengths L3, L4 are set to be equal to each other and longer than the first and second lengths L1, L2 (L3=L4>L1=L2). Further, the third width W3 is set to be shorter than the fourth width W4 (W3<W4). Also with this setting, the first upper projection 311, the first lower projection 312, the second upper projection 313 and the second lower projection 314 can have mutually different shapes.

Figure 9:
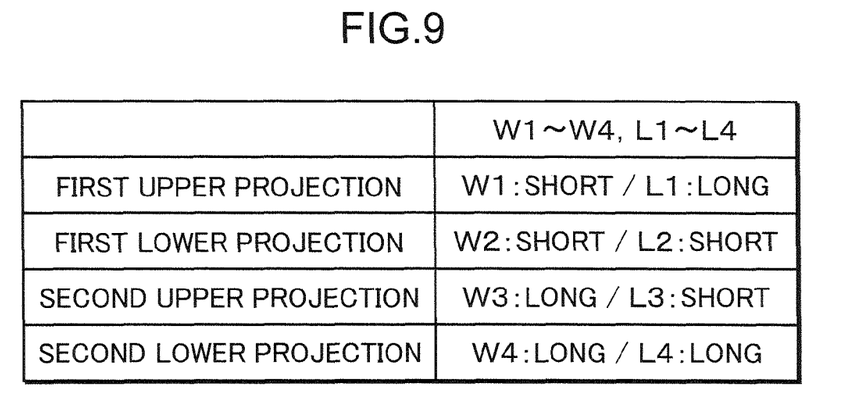
FIG. 9 is a table showing setting of first to fourth widths and first to fourth lengths.
Figure 10:
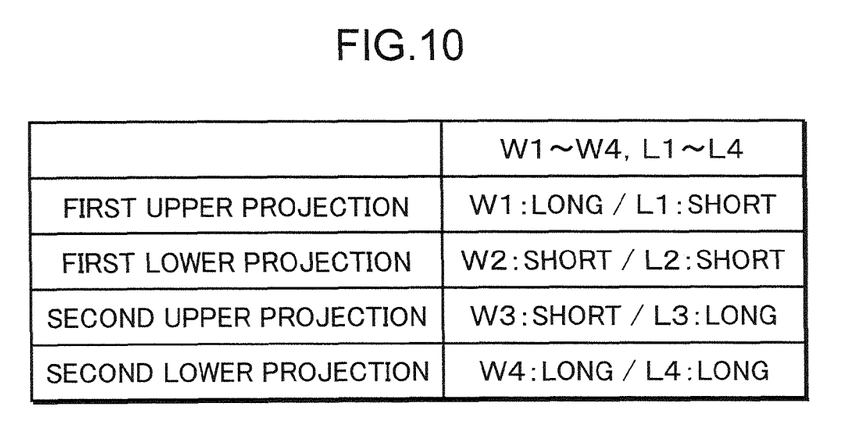
FIG. 10 is a table showing another setting of the first to fourth widths and the first to fourth lengths.

To more easily describe the setting of the first to fourth widths W1 to W4 and the first to fourth lengths L1 to L4, the respective magnitudes of the first to fourth widths W1 to W4 and the first to fourth lengths L1 to L4 are simply indicated by "long" and "short". Then, the setting of the first to fourth widths W1 to W4 and the first to fourth lengths L1 to L4 (combinations of the width and the length) in FIGS. 5 and 6 are expressed as shown in FIG. 9. Further, the setting of the first to fourth widths W1 to W4 and the first to fourth lengths L1 to L4 in FIGS. 7 and 8 are expressed as shown in FIG. 10. As is clear from FIGS. 9 and 10, the combinations of the width and the length all differ among the first upper projection 311, the first lower projection 312, the second upper projection 313 and the second lower projection 314.

Out of the first upper projection 311, the first lower projection 312, the second upper projection 313 and the second lower projection 314 described above, the first upper and lower projections 311, 312 form a first positioning portion and a first projection and the second upper and lower projections 313, 314 form a second positioning portion and a second projection portion.

The housing 33 is formed with a locking portion for locking the second lens 30. Specifically, the bottom wall 330 of the housing 33 is formed with a first recess 334 (first engaging portion) shaped to be able to lock the first lower projection 312 and a second recess 335 (second engaging portion) shaped to be able to lock the second lower projection 314 as shown in FIG. 3. The respective first and second recesses 334, 335 may be dimensioned to be engaged with the first and second lower projections 312, 314.

According to the exposure device 6 of this embodiment described above, the holding portion 302 of the second lens 30 includes the first upper and lower projections 311, 312 formed at the side of the incident surface 307 of the lens body 301 and the second upper and lower projections 313, 314 formed at the side of the output surface 308. Since the first to fourth widths W1 to W4 and the first to fourth lengths L1 to L4 are set as shown in FIG. 9 or 10, the first upper projection 311, the first lower projection 312, the second upper projection 313 and the second lower projection 314 have mutually different shapes. On the other hand, the bottom wall 330 of the housing 33 is formed with the first recess 334 for locking the first lower projection 312 and the second recess 335 for locking the second lower projection 314.

Accordingly, although the lens body 301 is asymmetrically shaped in the main scanning direction S1 of the laser beam, the operator can easily identify a correct orientation of the lens body 301 based on an engagement relationship of the first lower projection 312 and the first recess 334 and that of the second lower projection 314 and the second recess 335 when mounting the second lens 30. In this way, the inverted mounting of the second lens 30 is prevented. The above engagement relationships are effective particularly when the asymmetry of the second lens 30 is small and visual judgment is very difficult. The above engagement relationships are also effective when optical properties differ between left and right sides although the lens body 301 is symmetrically shaped.

Further, since the holding portion 302 of the second lens 30 includes the four projections, i.e. the first upper projection 311, the first lower projection 312 and the second upper and lower projections 313, 314, the second lens 30 can be mounted into the housing 33 in two ways. That is, the second lens 30 can be mounted by bringing the lower wall 304 of the holding portion 302 into contact with the bottom wall 330 of the housing 33 as shown in FIGS. 5 to 8 and can also be mounted by rotating the second lens 30 about the optical axis by 180° and bringing the upper wall 303 into contact with the bottom wall 330 of the housing 33. Even if the second lens 30 is mounted in the latter way according to the designs of the exposure device 6 and the image forming apparatus, it is only sufficient to change the respective shapes of the first and second recesses 334, 335 of the housing 33 in such a manner as to conform to the shapes of the corresponding first and second upper projections 311, 313. In this way, the second lens 30 can be mounted into the housing with the inverted mounting thereof prevented according to the designs of the exposure device 6 and the image forming apparatus.

Further, according to the exposure device 6 of this embodiment, the first to fourth widths W1 to W4 are dimensions along the main scanning direction S1 of the laser beam and the first to fourth lengths L1 to L4 are dimensions along the optical axis direction LA of the laser beam. Thus, the second lens 30 can be positioned in both the main scanning direction S1 and the optical axis direction LA. This can ensure the scanning accuracy of the laser beam.

Furthermore, according to the exposure device 6 of this embodiment, the inverted mounting of the second lens 30 can be prevented by a simple structure composed of the first upper projection 311, the first lower projection 312, the second upper projection 313 and the second lower projection 314 of the second lens 30 and the first and second recesses 334, 335 of the housing 33. Further, since the first upper projection 311, the first lower projection 312, the second upper projection 313 and the second lower projection 314 are integrally molded, an accurate positional relationship can be obtained among the first upper projection 311, the first lower projection 312, the second upper projection 313, the second lower projection 314 and the lens body 301. This enables the second lens 30 to be smoothly mounted into the housing 33.

Figure 11:
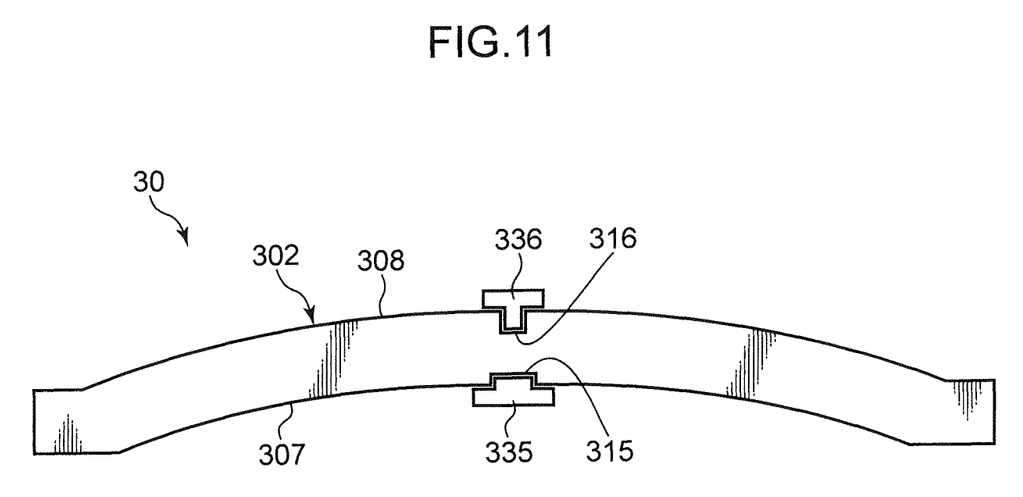
FIG. 11 is a plan view showing a second lens according to a modification.

In the embodiment described above, the first positioning portion (first upper and lower projections 311, 312) and the second positioning portion (second upper and lower projections 313, 314) are in the form of projections and the first engaging portion (first recess 334) and the second engaging portion (second recess 335) are in the form of recesses. Conversely, the first and second positioning portions may be in the form of recesses and the first and second engaging portions may be in the form of projections. Specifically, as shown in FIG. 11, an incident surface side recess 315 is formed at the incident surface side of the lower wall 304 of the holding portion 302 of the second lens 30 and an output surface side recess 316 is formed at the output surface side thereof. The incident surface side recess 315 and the output surface side recess 316 have mutually different shapes. The bottom wall 330 of the housing 33 is formed with an incident surface side projection 336 to be locked by the incident surface side recess and an output surface side projection 337 to be locked by the output surface recess. Even in the case of this construction, the inverted mounting of the second lens 30 can be prevented.

According to the optical device and the image forming apparatus with the same according to the present disclosure, an operator can easily identify a correct orientation of a lens even if a lens is asymmetrically shaped in a laser beam scanning direction. This can prevent the inverted mounting of the lens.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An optical device, comprising:
a laser light source for outputting a laser beam;
an optical member including an aspherical lens with an incident surface on which the laser beam is incident and an output surface from which the laser beam is output, and configured to scan the laser beam output from the output surface across a predetermined target; and
a housing for housing the optical member;
wherein:
the optical member further includes a first positioning portion at a side of the incident surface and a second positioning portion at a side of the output surface, the first positioning portion includes a first upper projection and a first lower projection or a first upper recess and a first lower recess facing each other with the lens located therebetween in a direction substantially perpendicular to a main scanning direction in which the laser beam is scanned, the second positioning portion includes a second upper projection and a second lower projection or a second upper recess and a second lower recess facing each other with the lens located therebetween in a direction substantially perpendicular to the main scanning direction;
the housing includes a first engaging portion to be engaged with the first positioning portion and a second engaging portion to be engaged with the second positioning portion, the first engaging portion is formed as a first recess to be engaged with the first lower projection, or a first projection to be engaged with the first lower recess, the second engaging portion is formed as a second recess to be engaged with the second lower projection, or a second projection to be engaged with the second lower recess; and
the first upper projection, the first lower projection, the second upper projection and the second lower projection, or the first upper recess, the first lower recess, the second upper recess and the second lower recess have mutually different shapes.

2. An optical device according to claim 1, wherein:
the first upper projection and the first lower projection or the first upper recess and the first lower recess have incident surface side widths along the main scanning direction in which the laser beam is scanned and incident surface side lengths along an optical axis direction in which the laser beam passes through the lens;
the second upper projection and the second lower projection or the second upper recess and the second lower recess have output surface side widths along the main scanning direction and output surface side lengths along the optical axis direction;
the incident surface side widths and the output surface side widths differ; and
the incident surface side lengths and the output surface side lengths differ.

3. An optical device according to claim 1, wherein:
the first upper projection or the first upper recess has a first width along the main scanning direction and a first length along the optical axis direction in which the laser beam passes through the lens;
the first lower projection or the first lower recess has a second width along the main scanning direction and a second length along the optical axis direction;

the second upper projection or the second upper recess has a third width along the main scanning direction and a third length along the optical axis direction;
the second lower projection or the second lower recess has a fourth width along the main scanning direction and a fourth length along the optical axis direction; and
the first to fourth widths and the first to fourth lengths are so specified that the first upper projection, the first lower projection, the second upper projection and the second lower projection or the first upper recess, the first lower recess, the second upper recess and the second lower recess have mutually different shapes.

4. An optical device according to claim 3, wherein:
the first width and the second width are set to be equal;
the first length is set to be longer than the second and third lengths;
the second length is set to be shorter than the fourth length;
the third and fourth widths are set to be equal to each other and longer than the first and second widths; and
the third length is set to be shorter than the fourth length.

5. An optical device according to claim 3, wherein:
the first and second lengths are set to be equal;
the first width is set to be longer than the second and third widths;
the second width is set to be shorter than the fourth width;
the third and fourth lengths are set to be equal to each other and longer than the first and second lengths; and
the third width is set to be shorter than the fourth width.

6. An optical device according to claim 1, wherein:
the first and second positioning portions are integrally molded to the lens.

7. An image forming apparatus, comprising:
a photoconductive drum; and
an optical device for irradiating the circumferential surface of the photoconductive drum with a laser beam, the optical device including:
a laser light source for outputting a laser beam;
an optical member including an aspherical lens with an incident surface on which the laser beam is incident and an output surface from which the laser beam is output, and configured to scan the laser beam output from the output surface across a predetermined target; and
a housing for housing the optical member;
wherein:
the optical member further includes a first positioning portion at a side of the incident surface and a second positioning portion at a side of the output surface, the first positioning portion includes a first upper projection and a first lower projection or a first upper recess and a first lower recess facing each other with the lens located therebetween in a direction substantially perpendicular to a main scanning direction in which the laser beam is scanned, the second positioning portion includes a second upper projection and a second lower projection or a second upper recess and a second lower recess facing each other with the lens located therebetween in a direction substantially perpendicular to the main scanning direction;
the housing includes a first engaging portion to be engaged with the first positioning portion and a second engaging portion to be engaged with the second positioning portion, the first engaging portion is formed as a first recess to be engaged with the first lower projection, or a first projection to be engaged with the first lower recess, the second engaging portion is formed as a second recess to be engaged with the second lower projection, or a second projection to be engaged with the second lower recess; and
the first upper projection, the first lower projection, the second upper projection and the second lower projection, or the first upper recess, the first lower recess, the second upper recess and the second lower recess have mutually different shapes.

8. An image forming apparatus according to claim 7, wherein:
the first upper projection and the first lower projection or the first upper recess and the first lower recess have incident surface side widths along the main scanning direction in which the laser beam is scanned and incident surface side lengths along an optical axis direction in which the laser beam passes through the lens;
the second upper projection and the second lower projection or the second upper recess and the second lower recess have output surface side widths along the main scanning direction and output surface side lengths along the optical axis direction;
the incident surface side widths and the output surface side widths differ; and
the incident surface side lengths and the output surface side lengths differ.

9. An image forming apparatus according to claim 7, wherein:
the first upper projection or the first upper recess has a first width along the main scanning direction and a first length along the optical axis direction in which the laser beam passes through the lens;
the first lower projection or the first lower recess has a second width along the main scanning direction and a second length along the optical axis direction;
the second upper projection or the second upper recess has a third width along the main scanning direction and a third length along the optical axis direction;
the second lower projection or the second lower recess has a fourth width along the main scanning direction and a fourth length along the optical axis direction; and
the first to fourth widths and the first to fourth lengths are so specified that the first upper projection, the first lower projection, the second upper projection and the second lower projection or the first upper recess, the first lower recess, the second upper recess and the second lower recess have mutually different shapes.

10. An image forming apparatus according to claim 9, wherein:
the first width and the second width are set to be equal;
the first length is set to be longer than the second and third lengths;
the second length is set to be shorter than the fourth length;
the third and fourth widths are set to be equal to each other and longer than the first and second widths; and
the third length is set to be shorter than the fourth length.

11. An image forming apparatus according to claim 9, wherein:
the first and second lengths are set to be equal;
the first width is set to be longer than the second and third widths;
the second width is set to be shorter than the fourth width;
the third and fourth lengths are set to be equal to each other and longer than the first and second lengths; and
the third width is set to be shorter than the fourth width.

12. An image forming apparatus according to claim 7, wherein:
the first and second positioning portions are integrally molded to the lens.

13. An optical member to be housed in a housing including a first engaging portion and a second engaging portion, comprising:
an optical member body including an aspherical lens with an incident surface on which a laser beam is incident and an output surface from which the laser beam is output, and configured to scan the laser beam output from the output surface across a predetermined target;
a first positioning portion arranged at a side of the incident surface of the optical member body and to be engaged with the first engaging portion of the housing, the first positioning portion including a first upper projection and a first lower projection or a first upper recess and a first lower recess facing each other with the lens located therebetween in a direction substantially perpendicular to a main scanning direction in which the laser beam is scanned; and
a second positioning portion arranged at a side of the output surface of the optical member body, shaped differently from the first positioning portion and to be engaged with the second engaging portion of the housing, the second positioning portion including a second upper projection and a second lower projection or a second upper recess and a second lower recess facing each other with the lens located therebetween in a direction substantially perpendicular to the main scanning direction; wherein
the first engaging portion is formed as a first recess to be engaged with the first lower projection or a first projection to be engaged with the first lower recess;
the second engaging portion is formed as a second recess to be engaged with the second lower projection or a second projection to be engaged with the second lower recess; and
the first upper projection, the first lower projection, the second upper projection and the second lower projection, or the first upper recess, the first lower recess, the second upper recess and the second lower recess have mutually different shapes.

14. An optical member according to claim 13, wherein:
the first upper projection and the first lower projection or the first upper recess and the first lower recess have incident surface side widths along the main scanning direction in which the laser beam is scanned and incident surface side lengths along an optical axis direction in which the laser beam passes through the lens;
the second upper projection and the first lower projection or the first upper recess and the first lower recess have output surface side widths along the main scanning direction and output surface side lengths along the optical axis direction;
the incident surface side widths and the output surface side widths differ; and
the incident surface side lengths and the output surface side lengths differ.

* * * * *